United States Patent [19]

Jönsson et al.

[11] 4,080,656
[45] Mar. 21, 1978

[54] CONTROL DEVICE FOR MACHINING WEBS

[75] Inventors: Kjell Jönsson; Lennart Nilsson, both of Vasteras, Sweden

[73] Assignee: ASEA Aktiebolag, Vasteras, Sweden

[21] Appl. No.: 760,989

[22] Filed: Jan. 21, 1977

[30] Foreign Application Priority Data

Jan. 21, 1976 Sweden ................................ 7600575

[51] Int. Cl.$^2$ ......................... D21F 7/06; G06F 15/46
[52] U.S. Cl. ..................................... 364/471; 162/262; 364/105; 364/116; 364/474
[58] Field of Search ................ 235/151.1, 151, 151.11; 162/252, 253, 262, 263; 93/1 R, 1 C; 118/8, 9, 11; 72/7, 8, 10, 11, 16, 21

[56] References Cited

U.S. PATENT DOCUMENTS

| | | | |
|---|---|---|---|
| 2,922,475 | 1/1960 | Alexander | 162/252 |
| 3,552,162 | 1/1971 | Gingher, Jr. et al. | 235/151.1 UX |
| 3,574,280 | 4/1971 | Smith, Jr. | 235/151.1 UX |
| 3,592,031 | 7/1971 | Sutton et al. | 235/151.1 UX |
| 3,989,935 | 11/1976 | Fay | 235/151.1 |

*Primary Examiner*—Joseph F. Ruggiero
*Attorney, Agent, or Firm*—Kenyon & Kenyon, Reilly, Carr & Chapin

[57] ABSTRACT

In apparatus having at least two roll pairs and/or stretch rolls each having a driving means with an amplifier for speed control, the speed control reference for each drive is developed by summing signals developed in adjacent control circuits such as to obtain a relationship in which, for example, for the second drive the signal is $V_0(1 + S_1)(1 + S_2)$ where $V_0$ is a basic speed reference signal and $S_1$ and $S_2$ desired relative speed differences for first and second drives to thereby permit speed adjustments.

7 Claims, 1 Drawing Figure

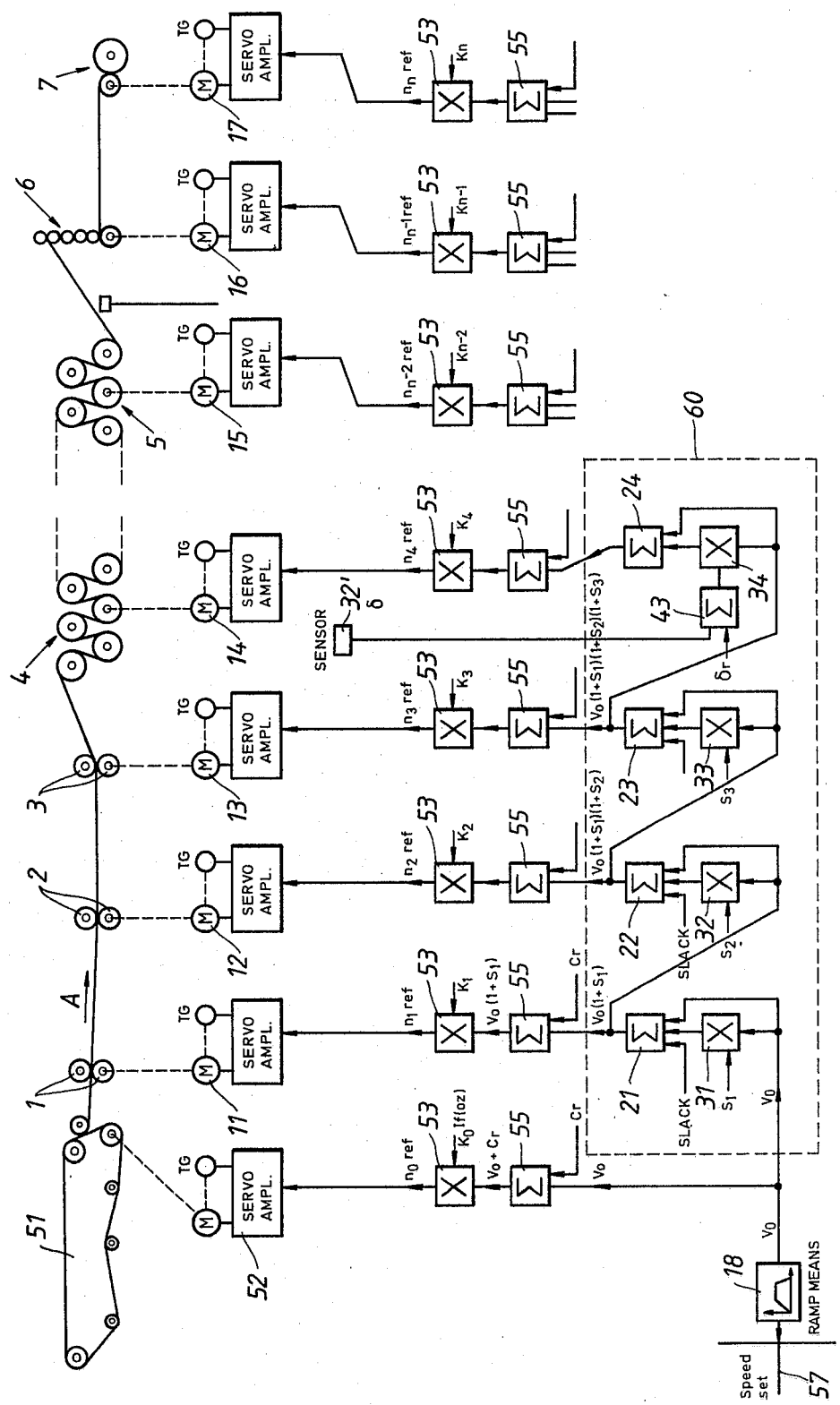

CONTROL DEVICE FOR MACHINING WEBS

BACKGROUND OF THE INVENTION

This invention relates to control arrangements for use in machining webs, such as paper machines with at least two roll pairs and/or stretch rolls, and more particularly to an improved control arrangement which permits greater speed adjustment between roll pairs and/or stretch rolls.

Various control devices are known for use in controlling the roll pairs and/or stretch rolls (hereinafter roll means) in paper machines and the like. A recent development in this area includes a control device for use in rolling mills or paper machines and has at least two roll means. With each roll means there is a drive means, e.g., a motor and an amplifier in a typical servo system for use in the speed control of its associated roll means. In addition, in some cases measuring means are disposed between adjacent roll means for measuring the condition of the paper web. The measured signal is coupled to an amplifier or adder the output of which is supplied to a multiplier along with an additional signal which is a function of the diameter of the corresponding driven roll, the gear ratio, and/or the desired tension of the paper web. The output signal of the multiplier is supplied to the corresponding amplifier. Here, in conventional fashion it is compared with an acutal speed signal developed in a tachometer generator and the driving means, e.g., the motor controlled accordingly so that the actual speed and desired speed are the same. The basic speed is established in the system and is designated $V_0$. This basic signal is fed with some possible modification to the first driving means in the system. i.e., a drive preceding the roll means. The signal for each roll means is developed utilizing adders or summing means and the aforementioned multiplier. In this signal, the signals developed in adders associated with preceding or subsequent drive means are added to the signal for a particular drive means. For example, if for a first drive means associated with a first roll means the signal from its adder is $V_0(S_1)$ then a signal will be supplied to the adder for the second pair of rolls such it develops an output signal $V_0(S_1 + S_2)$, $S_1$ and $S_2$ being the tensioning signals for the corresponding driving means. Similarly the output signal from the adder for the third roll means is $V_0(S_1 + S_2 + S_3)$.

This type of control works well with paper webs when the values of S are small. However, when such is not the case, since this is an arithmetical progression, an unreasonably high influence or subsequent driving means will occur. For example, where tensioning valves are greater than 10% problems occur. Thus, it becomes evident that there is a need for an improved type of control system of this nature.

SUMMARY OF THE INVENTION

The present invention provides such an improved control arrangement. In accordance with the present invention, the conventional multipliers and adders are associated with each drive means to develop a signal therefor. However, in accordance with the present invention, each adder is supplied with signals corresponding to signals from a preceding or subsequent adder respectively along with a signal from a basic reference voltage source which signal multiplied by the associated tension signal, i.e., the desired relative speed difference between adjacent driving means. This is possibly supplemented by an error signal for a corresponding measuring means. As a result, a geometrical progression is obtained for the input signals for the successive adders. For example, for the second adder the signal would be $V_0(1 + S_1)(1 + S_2)$ thus, a change at one adder will affect the other adders so as to maintain the proper speed relationships between the different roll means. This permits greater speed adjustments which would not be possible in a device according to the aforementioned application.

BRIEF DESCRIPTION OF THE DRAWINGS

The single FIGURE is a block diagram of a system according to the present invention.

DETAILED DESCRIPTION OF THE INVENTION

The present invention illustrates a paper machine which includes a plurality of roller pairs 1, 2 and 3 and also include stretch rollers 4, 5, 6 and 7. Each of the rollers pairs and stretch rollers are provided with driving means designated generally as 11, 12, 13, 14, 15, 16 and 17. Each of the driving means is a part of servo type system which will include a motor, a tachometer generator and a servo amplifier. The servo systems obtain input signals, to be developed in a manner described below, relating to a desired speed and compare these with the actual speed output of the tachometer generator to cause the motor to maintain the desired speed in well known fashion. Prior to the first set of rolls is a conventional apparatus 51 which establishes the paper web. This is driven by an amplifier 52 having as an input a desired speed signal $n_0$ ref. This signal is obtained from a multiplier 53 in which a signal $V_0 + Cr$ obtained from adder 55 is multiplied by a constant $K_0 I_f(oz)$ this later signal being a function of the diameter of its associated roll means, gear ratio, and/or desired tensioning. $V_0$ is the basic reference voltage for the apparatus. $Cr$ is simply a correction factor. The signal $V_0$ is obtained from a ramp means 18 which obtains an input from a speed set signal on line 57. The ramp circuit 18 is of conventional design and acts so as to prevent a change at the input from being immediately felt at the output. Thereby rapid changes of the speed in the system cannot take place. Rather they take place over a period time as the ramp causes the change to occur slowly.

What has been described so far is conventional. Similar multipliers 53 are associated with each of the other drives. The adding means 55 associated therewith are also conventional. The improvement of the present invention resides within the block 60 shown in dotted lines. In other words it is in a system for developing the reference input signal to the adders 55. As indicated, in the prior art the signals developed were equalled to $V_0(S_1 + \ldots S_n)$ where $n$ was the number of the roll means. However, in accordance with the present invention, for the first pair of rollers 1 and their associated drive system 11 a signal is developed by first multiplying the signal $V_0$ by $S_1$ in a multiplier 31. This signal is then summed with $V_0$ in an adder 21 so as to develop as an output, for input to the associated adder 55, a signal $V_0(1 + S_1)$. As is indicated, the adding means can also have as an input an additional factor relating to a desired slack. Note what is occurring here. With reference to the speed of the device 51, the speed of the rolls 1 are controlled so as to have that same speed plus a correction factor $V_0 S_1$ which is dependent upon the tensioning factor or desired speed relationship between the two. In other words one starts out with a speed which is the same and adds or subtracts therefrom. The output of the adder 21 is provided as an input to a multiplier 32 which is associated with the roll means 2 and drive 12. Here this quantity is multiplied by $S_2$. The output of multiplier 32 is an input to the adder 22 where the output of the adder 21 is again added to result in the output from adder 22 of $V_0(1 + S_1)(1 + S_2)$. Note that once again the speed signal includes a factor $V_0(1 + S_1)$ plus a factor $S_2(V_0)(1 + S_1)$. In other words, the speed reference supplied to the drive 12 for driving the roll means 2 starts out with the speed equal that of the roll means 1 and then adds thereto a correction based on $S_2$. The output of the adder 22 is an input to the multiplier 33 where it is multiplied by the factor $S_3$. The output of the multiplier 33 and the output of the adder 22 are summed in the adder 23 to develop the signal $V_0(1 + S_1)(1 + S_2)(1 + S_3)$.

Also shown is the manner in which the present system utilizes the output of a measurement sensor 32' designated $\delta$. This signal is provided through an adder and integrator 43 where it is differenced with the desired value $\delta_r$ and that output used as the value $S_4$ into a multiplier 34. In this case the multiplier obtains it other input from the adder 22 with the output of the multiplier 34 and adder 22 summed in the adder 24.

The additional sets of stretch rolls 5, 6 and 7 can be supplied in similar fashion.

Preferably the multipliers and adders are digital multipliers and digital adders. A basic speed $V_0$ is established as a digital value with the ramp means 18, which may simply be a clocked counter and comparator arrangement which permits the counter to step upward until the desired setting at the comparator is reached. This causes the speed to be brought up gradually and also causes a gradual change in speed where such is called for at the input. Preferably the ramp device should have a long integration time when used in paper machines. The present invention permits making speed adjustments in dependence on variation in the properties of the paper web without risk of a web break. This is a direct result of the ramp means and also of the interdependence of speed between the various sets of rolls and stretch rolls. The device in the present invention permits automatic cascade control of the draw setting. When a draw change occurs or a slack arises within one section (between two driving sections), the subsequent sections are automatically adjusted in order to achieve an unaltered draw between the driven sections.

Thus, an improved control arrangement for use in controlling paper webs and the like has been shown. Although a specific embodiment has been illustrated and described, various modifications may be made without departing from the spirit of the invention which is intended to be limited solely by the appended claims.

What is claimed is:

1. In a web making machine such as a paper making machine or the like, with at least two roll means each of which is servo controlled by an associated servo including driving means for the roll means, each servo having associated therewith summing means for developing a reference signal and multiplying means having as an input the output of the summing means and an input proportional to at least one of the diameter of the corresponding driven roll means, the gear ratio and the desired stretching of the web and providing its output as an input to the servo, an improved system for developing the reference signals for said multiplying means comprising means associated with each multiplying means obtaining an input from the output of the summing means associated with an adjacent servo for multiplying said output by $1 + S$ where S is the desired relative speed difference between the driving means with which said means is associated and the adjacent driving means.

2. Apparatus according to claim 1 wherein measuring means are located between at least two of said roll means and further including means for using the output of said measuring means in determining said value of S.

3. Apparatus according to claim 1 wherein said summing means and multiplying means are digital adders and multipliers.

4. Apparatus according to claim 1 wherein the summing means associated with the first roll means in the direction of working of the web has as its input signal $V_0(1 + S_1)$ where $V_0$ is the output signal from a basic reference voltage source and $S_1$ the relative speed difference between the driving means of said first roll means and an adjacent driving means.

5. In apparatus for machining webs such as a paper making machine which includes at least first and second roll means; first and second servo systems driving said roll means, first and second multipliers supplying reference inputs to said servo systems, said multipliers having as inputs a first reference voltage and a multiplication factor which is a function of at least one of the diameter of the roll means being driven, the gear ratio and desired stretching of the web, and first and second summing means providing said first reference voltage corrected by a correction factor at their output and adapted to receive a second reference voltage value at their input, an improved means for establishing the second reference voltages for said first and second adders comprising:
   a) a third multiplier having as a first input a basic reference voltage value and as a second input a value $S_1$ which is a function of the relative speed of the first roll means with respect to an adjacent roll means;
   b) a third adder having as inputs the output of said third multiplier and said basic reference voltage and providing its output to said first adder;
   c) a fourth multiplier having as inputs the output of said third adder and a reference value $S_2$ which is a function of the relative speed of said second roll means with respect to an adjacent roll means; and
   d) a fourth adder having as inputs the output of said fourth multiplier and the output of said third adder and providing its output as the input to said second adder.

6. Apparatus according to claim 5 wherein all of said multipliers and adders are digital multipliers and adders.

7. Apparatus according to claim 5 wherein measuring means are located between at least two of said roll means and further including means for using the output of said measuring means in determining said value of S.

* * * * *